3,328,834
ROTARY FISH SCALER
Russell A. Pulcifer, 628 Oakdale St. SE.,
Grand Rapids, Mich. 49506
Filed June 21, 1965, Ser. No. 465,670
1 Claim. (Cl. 17—5)

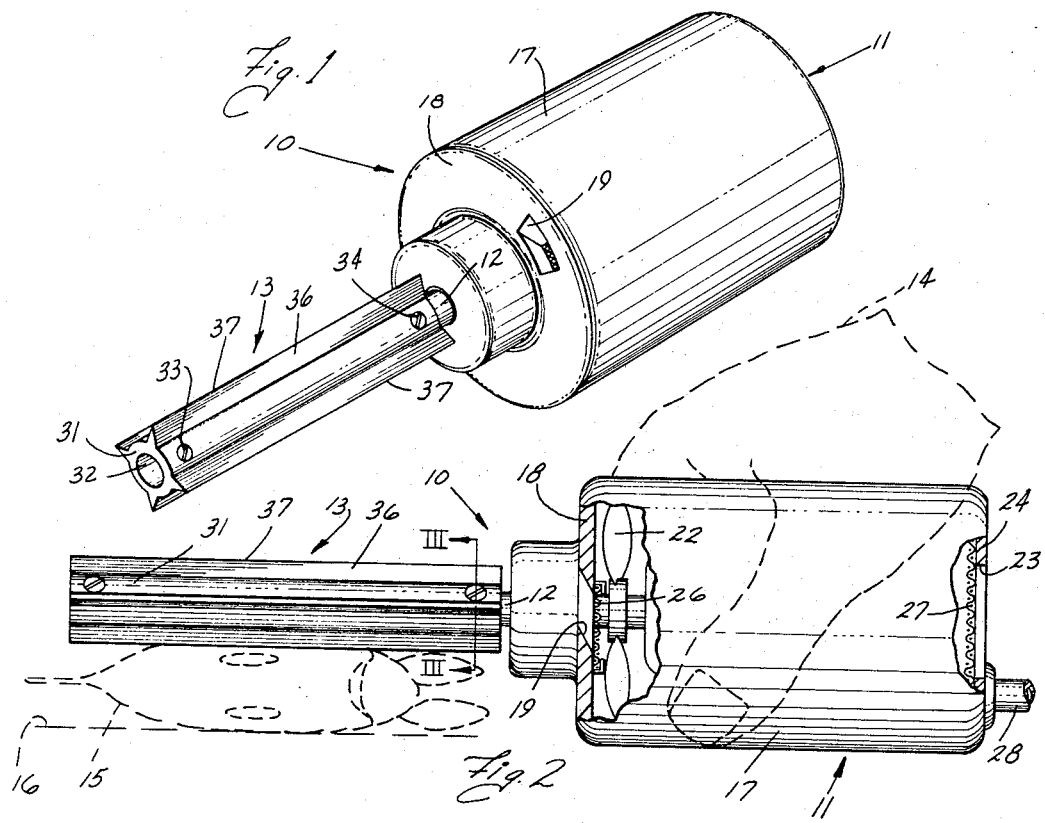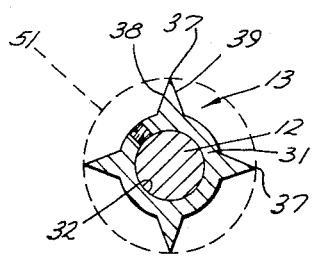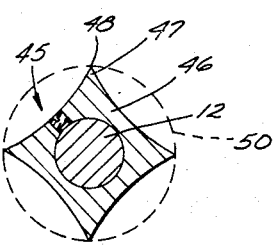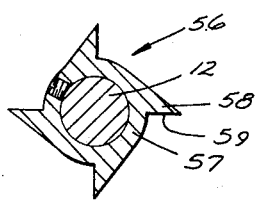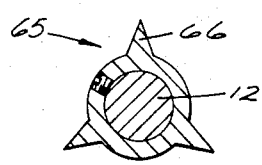
INVENTOR.
RUSSELL A. PULCIFER
BY
ATTORNEYS sell A. Pulcifer, 628 Oakdale St. SE.,
United States Patent Office 3,328,834
Patented July 4, 1967

This invention relates in general to a rotary fish scaler and, more particularly, to a small type thereof whereby the scales of a pan fish, for example, can be quickly and easily removed without causing said scales to scatter widely during the scaling operation.

The removal of scales from a fish is probably one of the oldest problems known to man. Moreover, the Patent Office files indicate that a great deal of time and thought have been devoted to the development of a completely satisfactory device for effecting the quick and tidy removal of scales from a fish. Evidently the complete solution has not yet been found, however, because the development continues.

After considerable thought on this problem, I found that a rotary fish scaler could remove the scales at least as quickly as any available fish scaling device, and more quickly than most. However, all such rotary scalers tend to throw the scales so that the advantages of their speed is often outweighed by the disadvantages of the mess which they create. It has also become apparent that existing rotary scaling devices require some type of shield mechanism which not only complicates the cleaning of the tool, but also adds to its cost, increases its weight and makes the device more difficult to handle. Furthermore, even those prior devices having a shield still tend to throw substantial amounts of scales.

While studying these facts, I discovered that the scattering of the scales by a rotary scaler could be remarkably minimized by using a scale removing member or tool having a relatively small diameter, by comparison with the diameter of other rotary tools for the same purpose, and then rotating such tool within a selected speed range. That is, scattering could be greatly diminished by carefully selecting the shape and radial extent of the scale engaging elements and carefully controlling the tip speed of said elements.

Accordingly, a primary object of this invention has been the provision of a rotary fish scaling device having an electric motor, which can be conveniently grasped by and held in the hand of an average adult, and a scaling tool which is rotated by the motor to remove the scales from a fish quickly and efficiently without scattering the scales.

A further object of this invention has been the provision of a scaling device, as aforesaid, wherein the rotary tool is elongated and relatively small in diameter so that it can be, and preferably is, rotated at a relatively high rate of speed without creating a high tip or peripheral speed, whereby the tendency to throw the scales is minimized.

A further object of this invention has been the provision of a scaling device, as aforesaid, having a tool which is small, inexpensive, light in weight, easy to clean and reversible to increase its useful life.

A further object of this invention has been the provision of a scaling device, as aforesaid, which is convenient to transport, easy to handle and adaptable to operation from a low voltage source, such as an automobile battery.

Other objects and purposes of this invention will become apparent to persons familiar with this type of equipment upon reading the following specification and examining the accompanying drawings, in which:

FIGURE 1 is a perspective view of a fish scaling device embodying the invention.

FIGURE 2 is a side elevational view of said fish scaling device with a broken line showing of a hand holding said device and a fish being scaled thereby.

FIGURE 3 is a sectional view taken along the line III—III in FIGURE 2.

FIGURE 4 is a sectional view similar to the sectional view shown in FIGURE 3 and disclosing an alternate tool construction.

FIGURE 5 is a sectional view similar to the sectional view shown in FIGURE 3 and disclosing another alternate tool construction.

FIGURE 6 is a sectional view similar to FIGURE 3 and showing a further alternative construction of the tool.

For convenience in description, the terms "front", "rear" and words of similar import will have reference to the left and right ends, respectively, of the scaling device of the invention as appearing in FIGURES 1 and 2. The terms "inner," "outer" and derivatives thereof will have reference to the geometric center of said scaling device and parts thereof.

General construction

The objects and purposes of the invention, including those set forth above, have been met by providing a fish scaling device comprised of a relatively small electric motor of relatively small horsepower and capable of operating from a low voltage direct current supply, such as that provided by the usual automobile battery. A scaling member or tool which is elongated and preferably tubular, is mounted upon the motor shaft of the motor and has a plurality of radially projecting uniformly spaced ridges which extend lengthwise of the tool and are especially designed so that they minimize the throwing of the scales during the scaling operation performed thereby. The rotational speed of the motor and the radial dimensions of the tool and its ridges are of importance in this invention.

Detailed description

The fish scaler 10 (FIGURES 1 and 2), which illustrates a preferred embodiment of the invention, is comprised of a relatively small electric motor 11 having a shaft 12 upon which the scaling tool or member 13 is supported. As indicated by the broken line showing of a hand 14 in FIGURE 2, the outer casing or housing 17 of the motor 11 is preferably cylindrical, somewhat elongated and of sufficiently small diameter that it can be comfortably held in the hand of an average adult. Thus, the tool 13 can be easily held in a horizontal position adjacent the upper side of a fish 15 (FIGURE 2) which is supported upon a horizontal surface 16, such as the top of a table.

The motor may be any one of several conventional types and is advantageously constructed so that it can be operated either from a low voltage, direct current source, such as a six volt or 12 volt battery, or from a conventional 110 volt source of A.C. potential. Alternatively, the fish scaler 10 can be produced in several models, each of which is adapted for connection to a particular source of electrical potential.

While a totally enclosed motor is not necessary, it may be deemed advantageous to provide a closed front end wall 18 on the casing 17 to simplify the cleaning of the fish scaler after use. However, the rearward end wall 24 may have openings for ventilation purposes. Where cooling of the motor, hence the casing 17, is desired, small air vents 19 may be provided in the front wall 18 and is preferably arranged at an acute angle to avoid scattering of the scales. A propeller 22 may be mounted upon the motor shaft 12 inside the casing 17 and adjacent said front wall 18 to draw air through the air inlets 23 in the rear wall 24. This air flows across the motor windings and is discharged through the air vents 19 after performing their cooling function. If desired, the air vent 19 and air inlet 23 may be covered with screens 26 and 27, respectively, to minimize contamination of the motor parts within the casing 17.

An electrical conductor 28 extends through the rear wall 24 for connecting the motor to a source of electrical energy.

The scaling tool 13 is preferably elongated and substantially tubular so that either end thereof can be mounted upon the motor shaft 12. Said tool 13 has a hollow, substantially cylindrical body 31 with a coaxial opening 32 into which the shaft 12 is slideably, but snugly received. A pair of set screws 33 and 34 are threadedly received radially through the body 31 near the opposite ends thereof for engagement alternatively with the shaft 12 to secure the tool 13 thereon. In a preferred embodiment of the invention, the body 31 is ⅜ of an inch in diameter and the opening 32 has a ¼-inch bore.

The tool 13 also includes a plurality, here four, of substantially radially projecting ridges 36, which preferably extend the full length of the body 31 and are uniformly spaced circumferentially therearound. In a preferred embodiment, and as shown in FIGURE 3, each ridge has an isosceles triangular cross section in which the base is slightly longer than half the altitude, the base being adjacent the body 31. The ridges 36 may be either integral with or attached to the body 31 and their radially outer edges 37 are reasonably sharp and parallel with the lengthwise axis of the body 31.

The tool 13 is preferably made from a noncorrosive material, such as stainless steel. However, brass, ordinary steel, aluminum or a durable plastic, such as polyvinylchloride, may be used.

The alternate tool 45 (FIGURE 4) has a body 46 upon which the ridges 47 may be formed by hollow grinding the side wall of the body 48 at four uniformly spaced locations thereon. Alternatively, the tool could be cast. However, the ridges 47 of the tool 45 do not have the sharply defined side walls corresponding to the side walls 38 and 39 on the ridges 36. Thus, there is less space between the tool body 46 and the broken line circle 50 passing through the edges 48 than there is between the body 31 and the broken line circle 51 passing through the edges 37. Accordingly, there is more space between the ridges 36 into which the fish scales can collect during the scaling operation.

The alternate tool 56 (FIGURE 5) has a body 57 with four radially projecting ridges 58 which may be substantially similar to the ridges 36 in the tool 13, except that one side wall 59 on the corresponding side of each ridge is radially disposed. Preferably, the side wall 59 faces in the direction of rotation of the tool and, accordingly, the ridges 58 produce more of a gouging effect than do the ridges 36 on the tool 13. With certain types of game fish, this arrangement can be advantageous.

The alternate tool 65 shown in FIGURE 6 may be substantially identical with the tool 13 except that there are only three ridges 66 instead of the four ridges 36 shown in FIGURE 3. That is, the ridges 66 have triangular cross sections, they are uniformly spaced and they define a circle approximately ⅝ of an inch in diameter.

*Operation*

As shown in FIGURE 2, the fish scaler 10 can be manually grasped and conveniently held in a substantially horizontal position so that the scaling tool 13 engages one side of a fish 15 supported upon any convenient surface 16. It has been found that with a tool 13 having the radial dimensions set forth above, a rotational speed of approximately from 1200 to 1400 r.p.m. produces the most desirable results. That is, the scales are removed quickly and completely without scattering them over a wide area, such as more than 10 or 12 inches from the point of engagement between the tool and the fish. Because of the relatively small size and horsepower of the motor used, there is no danger involved from engagement by the tool 13. In fact, with the style of tool shown in FIGURES 3, 4 and 6, for example, the tool can accidentally engage or be lightly held against, human skin without doing damage thereto. Particularly, where the scaler is operated from a low voltage source, such as the battery of an automobile or a motor boat, there is no danger from electrocution, even if the operator thereof is standing in water.

The turning radius of the tool is so small that it can be easily and effectively used on relatively small fish. The relatively small turning radius also accounts to a considerable extent for the lack of scale scattering which is characteristic of previous rotary scalers.

After the scaler has been used, the tool can be dipped in water and rotated to clean same. Alternatively, the tool can be removed from the motor by loosening one set screw and then sterilized in boiling water. The motor and tool are small enough that, when they are disconnected, both can be conveniently placed in a side pocket of an average coat for easy transport.

Although particular preferred embodiments of the invention have been disclosed above for illustrative purposes, it will be understood that variations or modifications of such disclosure, which come within the scope of the appended claim, are fully contemplated.

The embodiments of the invention in which an exclusive property or privilege is claimed are defined as follows:

A device for removing the scales from fish, comprising:
an electric motor having a substantially cylindrical housing and a concentric shaft extending from one axial end thereof, said housing being of sufficiently small diameter that it can be easily grasped and conveniently held in the average hand of an average adult, said motor having conductor means for connecting said motor to a source of electrical potential and being adapted to rotate said shaft at between 1200 and 1500 r.p.m.;
an elongated tubular body member having coaxial openings at the opposite ends thereof into which said shaft is snugly receivable, said member having a uniform cross section lengthwise thereof and an outside diameter of approximately three-eighths of an inch;
at least three and not more than four radially projecting and similar ridges extending lengthwise of and secured to said member, each ridge tapering radially to a sharp peripheral edge parallel with the lengthwise axis of said member;
said ridges being uniformly spaced circumferentially of said member, the sharp edges of said ridges defining a cylinder coaxial with said member and approximately ⅝ of an inch in diameter, each ridge having the cross-sectional shape of an isosceles triangle in which the base is approximately one-half of the altitude; and
means at both ends of said member for releasably holding said member on said shaft.

References Cited

UNITED STATES PATENTS

| | | | |
|---|---|---|---|
| 1,722,902 | 7/1929 | Carney | 17—19 |
| 2,557,272 | 6/1951 | Gabriel | 17—5 |
| 3,016,564 | 1/1962 | Soulier | 17—5 |
| 3,026,612 | 3/1962 | Szczepanski. | |

FOREIGN PATENTS

| | | |
|---|---|---|
| 131,961 | 3/1949 | Australia. |
| 470,211 | 1/1929 | Germany. |

LUCIE H. LAUDENSLAGER, *Primary Examiner.*

SAMUEL KOREN, *Examiner.*